US008166320B2

(12) United States Patent
Gabor et al.

(10) Patent No.: US 8,166,320 B2
(45) Date of Patent: *Apr. 24, 2012

(54) POWER AWARE SOFTWARE PIPELINING FOR HARDWARE ACCELERATORS

(75) Inventors: Ron Gabor, Raanana (IL); Hong Jiang, El Dorado Hills, CA (US); Alon Naveh, Ramat Hasharon (IL); Doron Rajwan, Rishon Le-Zion (IL); James Varga, Folsom, CA (US); Gady Yearim, Haifa (IL); Yuval Yosef, Haifa (IL)

(73) Assignee: Intel Corporation, Santa Clara, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 12/704,015

(22) Filed: Feb. 11, 2010

(65) Prior Publication Data
US 2010/0146314 A1 Jun. 10, 2010

Related U.S. Application Data

(63) Continuation of application No. 11/642,128, filed on Dec. 19, 2006, now Pat. No. 7,725,745.

(51) Int. Cl.
*G06F 1/32* (2006.01)
*G06F 1/00* (2006.01)
*G06F 9/30* (2006.01)
(52) U.S. Cl. ............ 713/320; 713/300; 712/219
(58) Field of Classification Search .......... 713/320
See application file for complete search history.

(56) References Cited

U.S. PATENT DOCUMENTS

| 5,931,942 | A | 8/1999 | Sugimoto | |
|---|---|---|---|---|
| 6,457,131 | B2 | 9/2002 | Kuemerle | |
| 6,976,178 | B1 | 12/2005 | Kissell | |
| 7,383,419 | B2 * | 6/2008 | Van Berkel et al. | 711/220 |
| 7,430,631 | B2 * | 9/2008 | Van Berkel et al. | 711/101 |
| 7,725,745 | B2 | 5/2010 | Gabor et al. | |
| 2007/0204318 | A1 | 8/2007 | Ganesh et al. | |

FOREIGN PATENT DOCUMENTS

| EP | 1956465 | 8/2008 |
|---|---|---|
| JP | 2004127139 A | 4/2004 |

OTHER PUBLICATIONS

First Office Action, Jun. 12, 2009, 6 pages, Application No. 2007103068699, State Intellectual Property Office of the P.R.C., Beijing, China.
Second Office Action, Jan. 15, 2010, 7 pages, Application No. 2007103068699, State Intellectual Property Office of the P.R.C., Beijing, China.
Non-Final Office Action for U.S. Appl. No. 11/642,128, Mailed Aug. 14, 2009, 10 pages.
Office Action from Chinese Patent Application No. 2007103068699, mailed Aug. 10, 2010, 7 pages.

* cited by examiner

*Primary Examiner* — Suresh Suryawanshi
(74) *Attorney, Agent, or Firm* — Blakely, Sokoloff, Taylor & Zafman LLP

(57) ABSTRACT

Forming a plurality of pipeline orderings, each pipeline ordering comprising one of a sequential, a parallel, or a sequential and parallel combination of a plurality of stages of a pipeline, analyzing the plurality of pipeline orderings to determine a total power of each of the orderings, and selecting one of the plurality of pipeline orderings based on the determined total power of each of the plurality of pipeline orderings.

21 Claims, 5 Drawing Sheets

Sequential work

Parallel (pipelined) work

POWER AWARE SOFTWARE PIPELINING FOR HARDWARE ACCELERATORS

CROSS REFERENCE TO RELATED APPLICATIONS

This application is a Continuation of U.S. patent application Ser. No. 11/642,128, entitled "Power aware software pipelining for hardware accelerators", by Ron Gabor et al., filed on Dec. 19, 2006 now U.S Pat. No. 7,725,745.

BACKGROUND

In processor-based platforms, lower platform power and maximized battery life are desirable features. Low hardware power states and memory self refresh modes, among others, may be used to reduce power consumption and increase battery life. It is desirable on power managed platforms to move as much of the hardware into low power states as possible, when feasible, and to increase memory self refresh time in order to minimize total platform power.

Some platforms may include components or functionality based on specialized hardware, often termed hardware acceleration. An example is a video decode data flow, which may pass data through multiple stages such as for example, a decoding stage, an image enhancement stage, and a composition stage as is known in the art. Several approaches can be used in order to lower the power consumption. One approach is to run a multi-stage hardware acceleration process such as a video decoder by pipeline processing through the stages so that all the stages are run in parallel, and then are shut down or idled until the next frame is scheduled to be processed. This approach may be based on an assumption that a parallelized pipeline leaves the platform most of the time in an idle mode, which enables a low power state for the various components.

DETAILED DESCRIPTION

Figure 1:
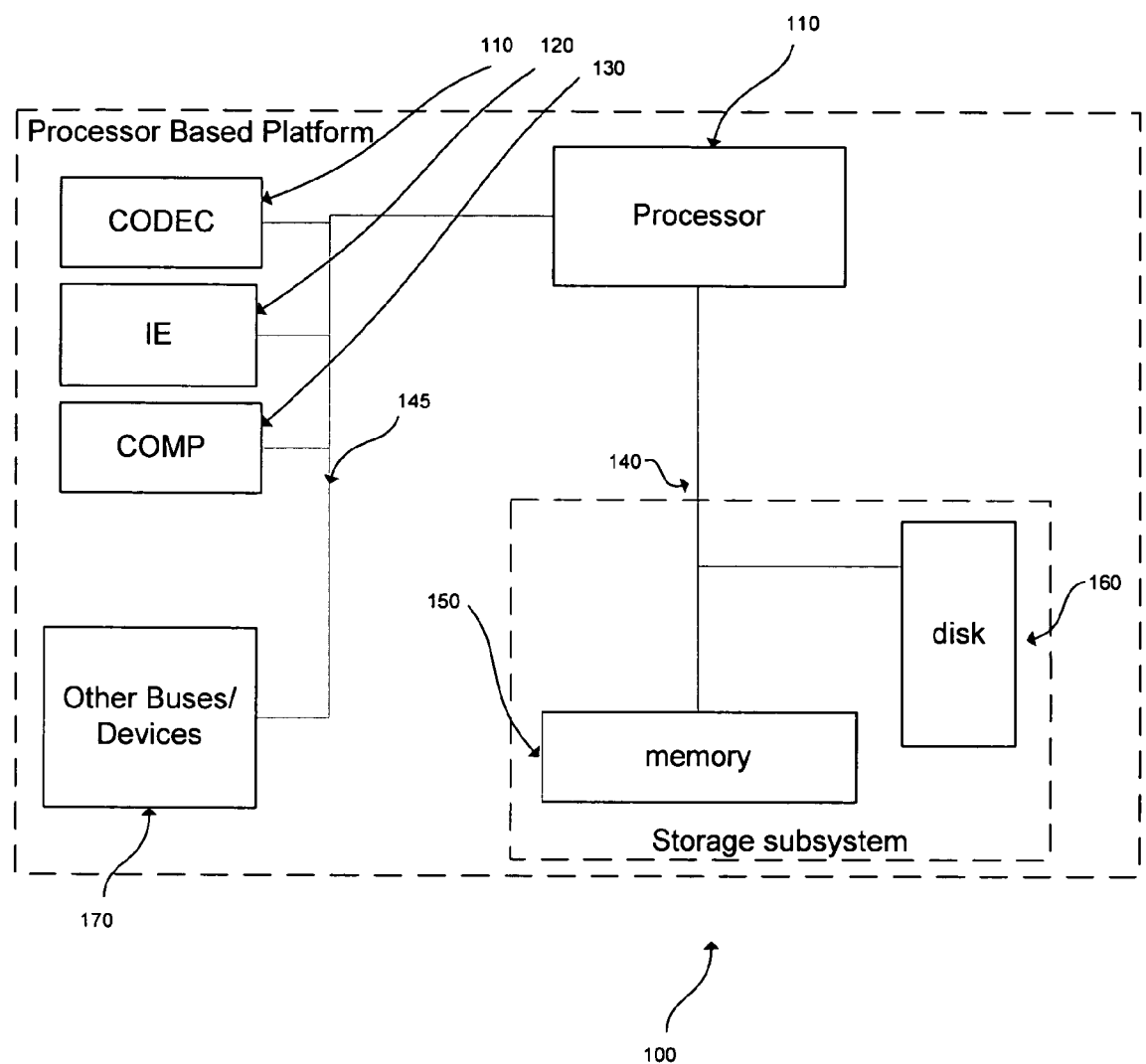
FIG. 1 depicts a processor based platform in one embodiment.

FIG. 1 depicts a processor based platform 100 in one embodiment. Such a system includes a processor or processors, potentially with one or more cores, 110, a storage subsystem including a read-write random access memory (RAM memory) 150 to store data and programs executable by the processor, and a non-volatile storage unit such as a disk system 160, interconnected by a bus system 140 and 145, and interfacing with the external network or users through system input/output (I/O) devices and peripherals 170. As is known, many other components such as a cache, other memory devices, etc. are also present with processor 110. Similarly other components may be present in a processor-based system, but are not depicted here in the interest of clarity.

In some embodiments, the processor based platform 100 may include specialized hardware units, also termed accelerators, for specific types of computation. For example, a video processing function may be provided as shown in FIG. 1 by hardware units 110, 120 and 130, each interconnected via a bus or buses to the system bus 145. In the exemplary embodiment depicted, the platform may be used, for example, to process high definition video. Thus, in the example shown in the figure, encoder-decoder unit (CODEC) 110 is a hardware decode unit or engine, to which a compressed video stream may be provided as input. The unit 110 decodes the video stream into frames. An Image enhancement (IE) unit 120 may be capable of image scaling, frame rate conversion, motion compensated de-interlacing and other related video processing and image enhancement functionality as is known. A composition (COMP) unit 130 may perform composition of several layers such as subtitles, graphics or an additional video streams on top of the main video stream.

Although the embodiments described herein are described in terms of a specific video processing application for concreteness, in other embodiments other types of hardware units or accelerators may be provided for different functional needs. For one instance, a specialized hardware unit may be used to perform surround sound decoding for a high-resolution, surround-sound processing computing platform such as one that may be used to mix, master or produce multi-channel digital audio content, or alternatively process a surround sound digital source for reproduction. In other embodiments, specialized hardware units may be used to generate three-dimensional graphics such as for gaming or scientific visualization applications. Many other embodiments using specialized hardware to perform processing in the context of a processor based platform are known in the art.

Figure 2:
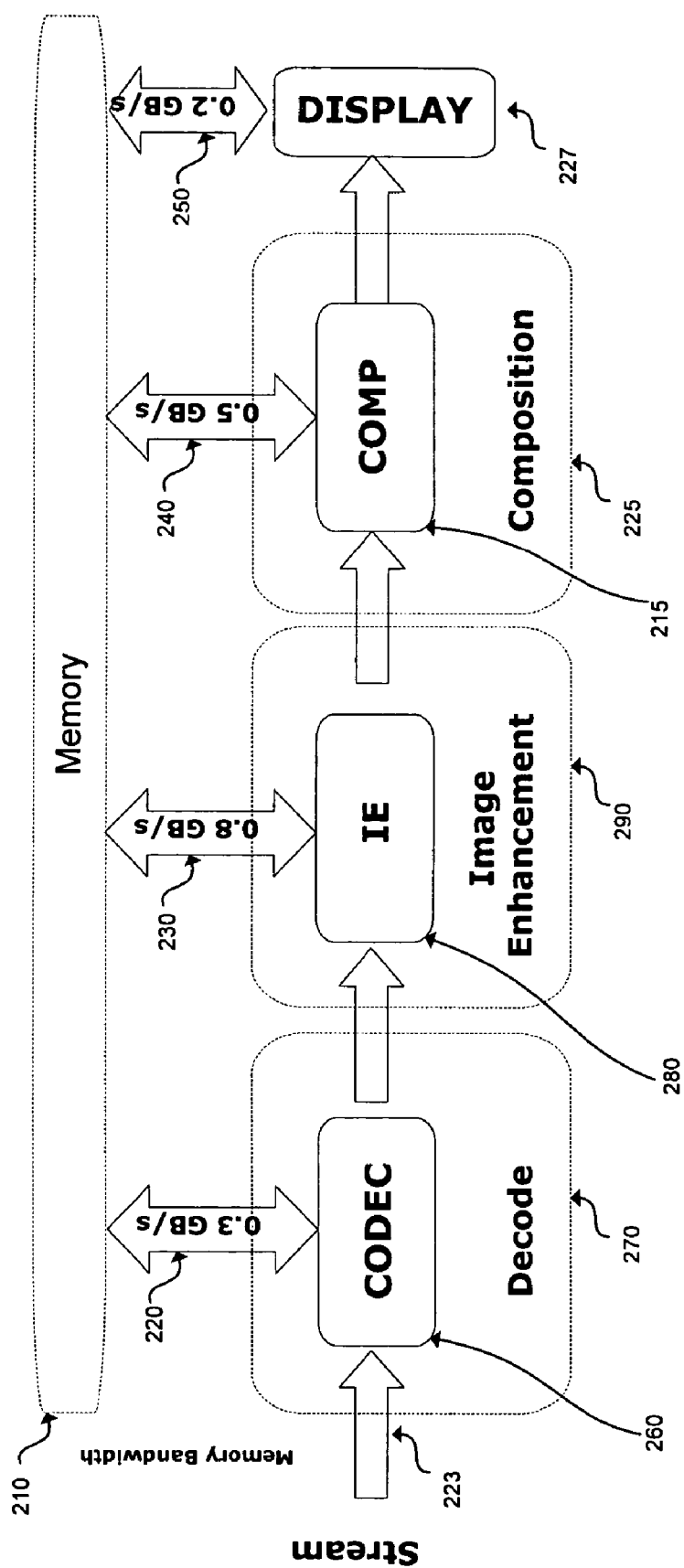
FIG. 2 depicts a multiple unit pipeline for video processing in one embodiment.

FIG. 2 depicts in more detail, at a block diagram level, video frame processing in one embodiment using a memory of a processor based platform and the hardware units such as described above. Each video frame goes through three hardware stages executed on three hardware units with data passing between the units through main memory. The figure depicts the three hardware units that process a video stream 223, made up of video frames, in the embodiment. The decode unit or CODEC 260, the Image Enhancement or IE unit 280 and the Composition or COMP unit 215. As a stream of video frames for processing passes through the units, it is processed as shown first by CODEC 260, then by IE 280, and finally by COMP 215. Processing 270 for decoding at CODEC 260 causes memory bandwidth utilization, 220, which may be as shown, 0.3 GB/s in this embodiment, though as is known the actual bandwidth will vary depending on the application, the hardware specific to an embodiment, maximum memory bandwidth available, and many other factors. Similarly, processing 290 at IE 280 may have a memory bandwidth demand of 0.8 GB/s as shown; and COMP processing 225 may have a bandwidth of 0.5 GB/s at 240 as shown. In addition to the hardware units, a display unit 227 may be present in the embodiment and the display, along with the other units, may use memory for data transfer, and place a load on the available memory bandwidth e.g. at a rate of 0.2 GB/s as shown at 250.

It should be re-emphasized that the numerical values of the bandwidths shown are only exemplary and should not be construed as limiting. As indicated previously, different sets of units may be present in different embodiments of video processing platforms; and of course, completely different units may be used in platforms that are functionally related to other types of processing such as digital audio processing; 3-D animation, and many others as is known.

Figure 3A:
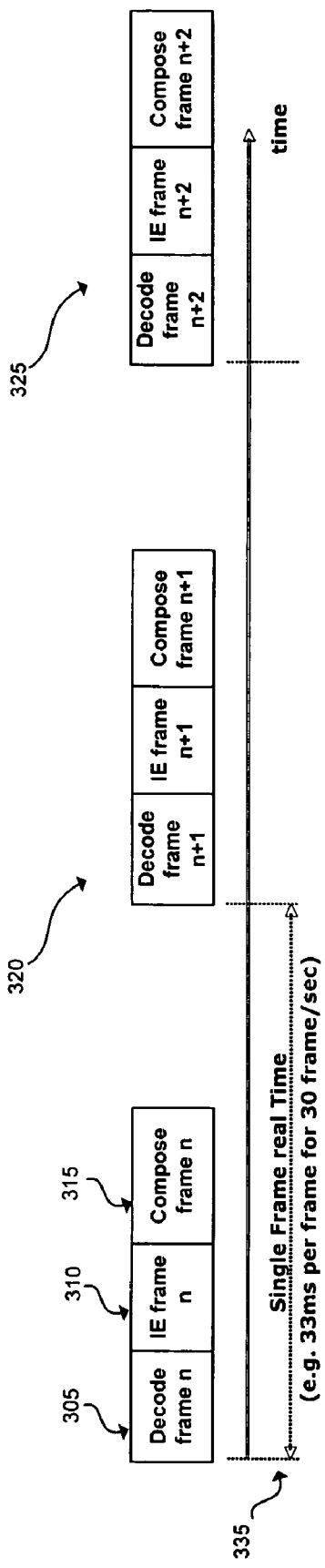
FIG. 3 depicts sequential and parallel combinations of video processing in one embodiment.
Figure 3B:
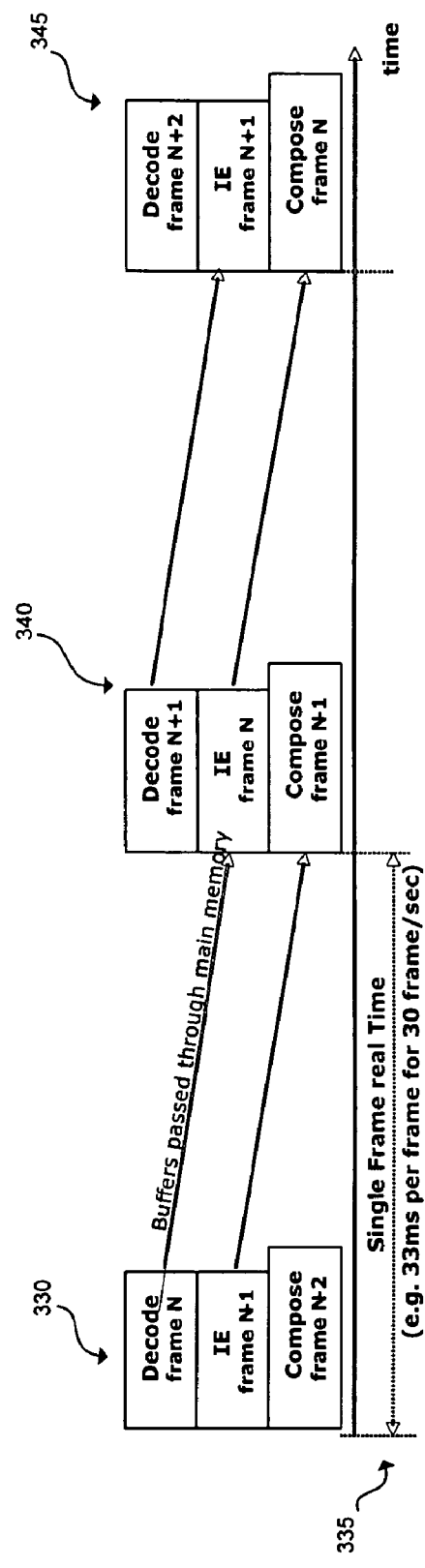

In general, multiple hardware units such as shown in FIGS. 1 and 2 may be scheduled to perform computations at least in part independently of each other. From a point of view of a software program executing on the platform of FIG. 1, and controlling the operation of specialized hardware units such as the ones depicted in FIG. 1 and FIG. 2, work may thus be dispatched to each of the hardware units in a sequential manner or in parallel manner as depicted in FIG. 3a and FIG. 3b. As shown in FIG. 3a, sequential combination or composition implies that a single frame goes through the three hardware units/stages one stage at a time. A parallel combination such as that shown in FIG. 3b means the three hardware units work in a pipelined fashion on different frames simultaneously.

Turning first to FIG. 3a, it may be seen that the operation of the processing stages on the different hardware units is sequential in time. For example, for a given frame n, a decode operation 305 precedes an enhancement operation 310, and the enhancement operation 310 precedes a composition operation 315 along the time line 335. The frame n+1 is processed in the same manner at 320 after frame n, and the frame n+2 is processed in the same manner at 325 after frame n+2. In general, in video processing a frame rate of 24-30 frames/second (fps) may be used. In the depicted embodiment, the frame rate is 30 fps and thus the maximum time available to fully process each frame is 33 ms.

Alternatively, as in FIG. 3b, a fully parallel combination of stages of work executing on the different units may be used. In this mode, all of the specialized hardware units execute in parallel and work is pipelined as is shown. Thus, as shown in FIG. 3b, while the DECODE unit is decoding frame n, the IE unit is decoding frame n−1, the COMP unit is composing frame n−2 in the first time slice at 330; in the next, the data from the IE unit is passed to the COMP unit, the data from the DECODE unit is passed to the IE unit, and a new frame is input to the DECODE unit. Thus, at 340, frame n+1 is decoded, from n is enhanced, and frame n−1 is composed; and the process continues analogously at 345.

When software such as video decoding software in this embodiment operates hardware units on a platform such as the platform of FIG. 1, it may be desirable for various reasons, such as operation on a mobile platform, to reduce total platform power consumption. As has been previously mentioned, it may be possible to reduce power by idling or shutting down platform resources at a time when they are not required by placing the resources in a low power consuming state. This may include, for example, shutting down portions of a processor, placing memory in a self-refresh mode, powering down or idling devices attached to a bus, etc., as is well known in the art. In general, when a pipelined process such as that depicted in FIG. 3a and in FIG. 3b is operating, it may not be possible to shut down or idle system resources when a unit such as DECODE, IE, or COMP, as in the embodiment of FIG. 1, is operating. Thus, it may seem that minimizing the fraction of the time slice required to process a video frame in the video processing embodiment of FIG. 1 may be a good approach to reducing total platform power.

A simple comparison of the time consumed by the platform in a sequential combination of stages with the time consumed by the platform in a parallel combination of stages executing on the units of the platform of an embodiment as in FIG. 3a and FIG. 3b respectively, may suggest that a parallel combination would provide the least overall load on platform power, based on an assumption that the total time taken by the units of this video processing embodiment to execute the pipelined and parallel combination of stages as in FIG. 3b would be smaller than the total time taken by the units to execute the sequential and serial combination of stages as in FIG. 3a, thus allowing for power-consuming components of the system to shut down for longer within the time available for processing a video frame.

This kind of analysis, however, is complicated by the fact that pipelined stages of a process such as that depicted in FIG. 3b interfere with each other via shared resources that the different units must access concurrently when scheduled to execute in a parallel combination. Often, memory access may be the limiting resource. Thus, the simultaneous memory bandwidth requirement of the various units becomes an issue (bottleneck). Instead of working quickly and moving the system to a low power state for the rest of a frame processing time unit (33 ms in this embodiment), the units share the memory, and thus may slow each other down and require a longer total operation time. In fact, it may therefore be the case that a combination of sequential and parallel scheduling of the stage in the pipeline will reduce total platform power below that of a purely parallel combination.

In order to minimize platform power individual components may be considered which can be put into low power state. These components, in our example, include the specialized hardware units (such as DECODE, COMP, IE, the memory controller of the platform, various buses), of the platform, and memory, among others as is known. It should be noted that leaving a unit active consumes power even if the unit is not performing any useful work. For example, combinational logic consumes power due to leakage unless power is turned off and memory consumes power as long as there are open pages even if there are no read or write transactions.

Figure 4:
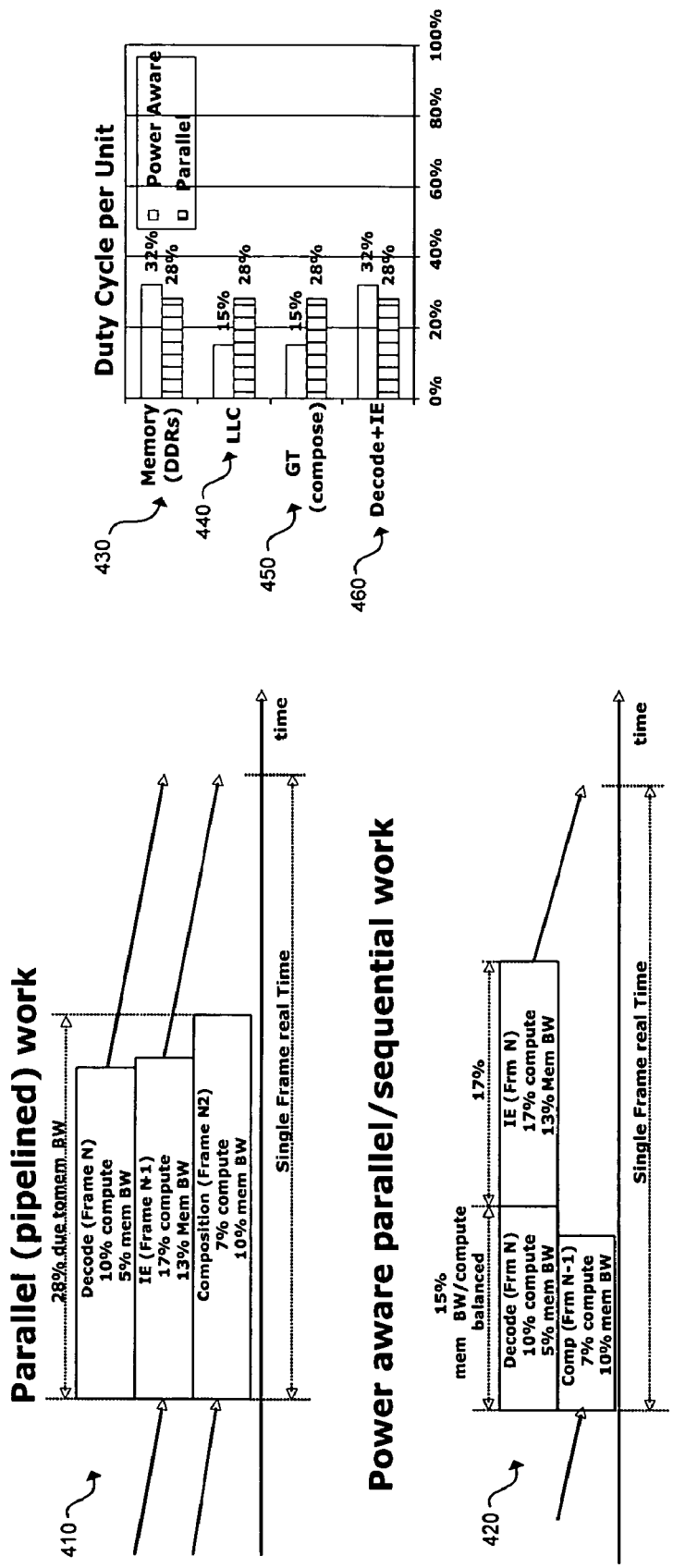
FIG. 4 depicts parallel and power aware combinations of video processing stages in one embodiment.

FIG. 4 shows the memory bandwidth in percentage of the total bandwidth for a 2 channel 1333 MHz Double-Data-Rate (DDR) memory system. The effective bandwidth of such a system is 11.5 GB/s (assuming 55% channel efficiency). The figure also shows the compute requirement for each hardware unit. For example, the composition unit (COMP) can compose a frame with subtitles in 7% of a frame time, and it requires 10% of the total memory bandwidth.

It should be noted that for simplicity the display refresh traffic going through the memory controller and the memory is omitted in the following analysis as well as the CPU's main cores compute and bandwidth requirements (e.g. stream preprocessing and audio processing). The display refresh traffic and the main CPU cores do not substantially change the tradeoffs shown below.

In FIG. 4, two possible combinations of work for the units are shown. In one instance, a purely parallel combination is shown, and its memory bandwidth needs are computed at 410. In another instance, a second parallel and sequential combination is shown, calculated to minimize total system power use, termed a power aware combination herein and this parallel and sequential combination is shown at 420.

On the right of the figure the actual duty cycle per unit is depicted as a bar graph for the embodiment. At 430, it may be seen that in the power aware combination, the memory duty cycle per unit is 32%; and in the parallel combination, it is 28%. Similarly, the duty cycles per unit are depicted at 440, 450, and 460 for the LLC, GT, and DECODE and IE in combination.

As shown in FIG. 4 at 410, the total duty cycle of parallel work is 28%, while the total duty cycle of the power aware mode shown at 420 is 32%.

In the example shown, in the power aware combination 420, the composition engine (COMP) along with portions of a processor used by COMP can be turned off for 85% of the time, while in the parallel or pipelined composition they can be turned off only 72% of the time. As may be seen from the figure at 420, the CODEC and IE hardware work longer (together) but they may consume a smaller amount of power (because IE if, for example, it is a low gate-count hardware accelerator). The memory moves to a lower power or self refresh mode when all units are off. When computing the power of the different units it turns out that the power aware manner shown in the bottom of FIG. 4 consumes less power than the parallel work fashion.

In the above description and figures, the exemplary embodiment is that of a video processing system with specific hardware units for accelerated processing. In the power aware composition described with reference to FIG. 4, the contentious resource is memory bandwidth. In other embodiments, the processing may or may not be video related, such as in audio, graphics, or other applications. Furthermore, in such applications, the contended-for resource may be other than memory bandwidth, such as network bandwidth, disk bandwidth, or a combination of more than one such resource, among others.

Figure 5:
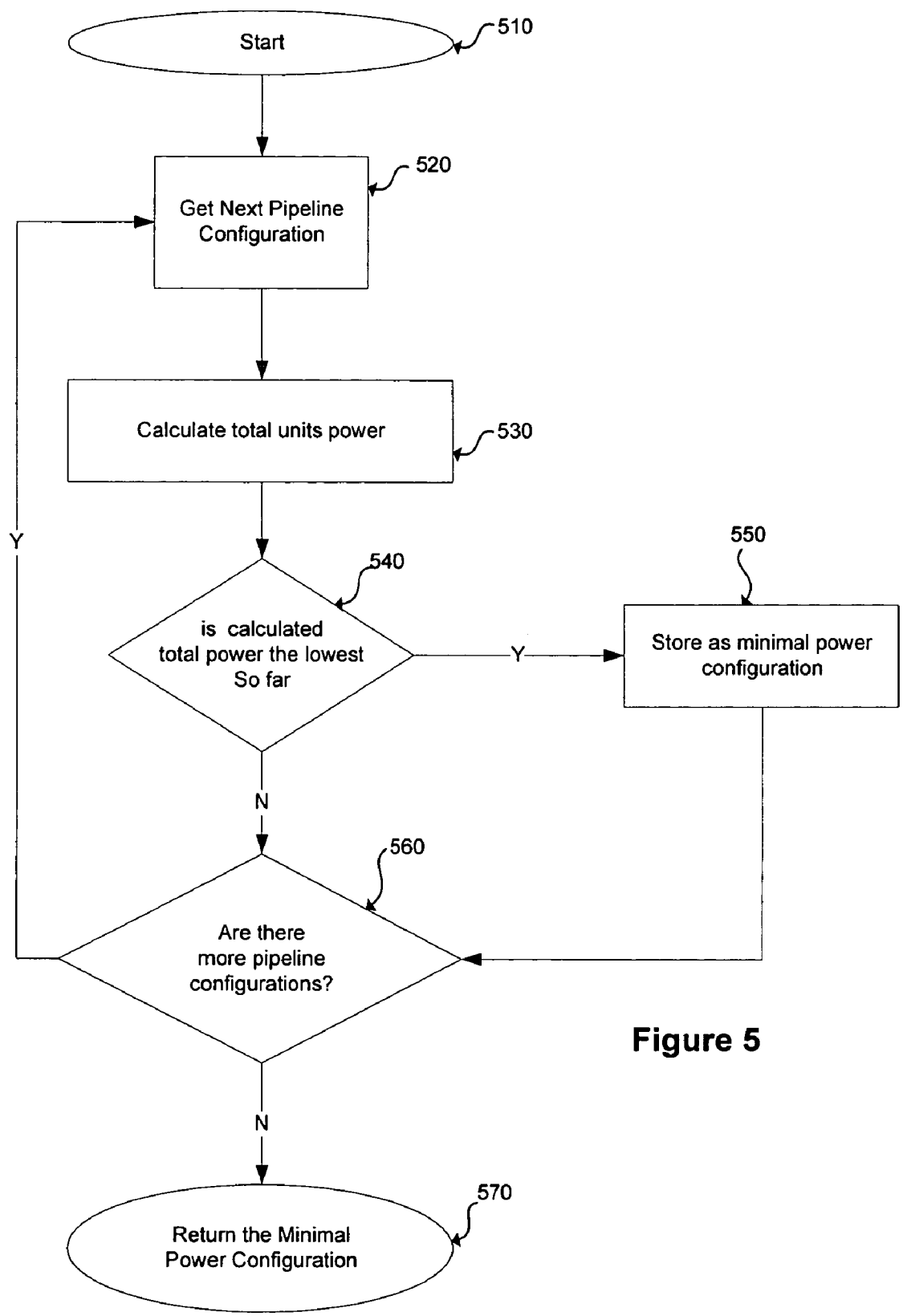
FIG. 5 depicts a flow of processing in one embodiment.

FIG. 5 depicts processing in one embodiment. The figure shows how a lower power using combination of units for processing is chosen in one embodiment, starting at 510. In the embodiment, at 520, a new pipeline configuration is generated. This may be a parallel, sequential, or parallel and sequential combination of processing in the execution units, such as e.g., DECODE, IE, and COMP in a video processing embodiment, such as the configurations depicted at 410 and 420 in FIG. 4. Based on known parameters including memory bandwidth, computation duty cycle, average active and inactive power, among others, a total units power for the configuration is calculated (or estimated), 530. A minimum calculated power is computed at 540 and stored at 50 and the processing loops through the remaining configurations, 560. At 570, the lowest power configuration as calculated is returned.

In general, the processing of FIG. 5 may be extended to many different embodiments, each having different types of units and for which the power calculation may differ as is known, and has been described above.

TABLE 1

Generalized Algorithm

Inputs:
    For each accelerator unit/stage (including may include main core/cores):
        Computation duty cycle (time required to finish computation assuming infinite mem bw)
        Required memory bandwidth
        Average power while active
        Average power while inactive (and powered) - static leakage power
        Relationships between units (e.g. legal pipeline ordering and groups that share voltage, that can be switched off completely when all of them are inactive)
    For memory subsystem:
        Total available memory bandwidth
        Average power while active (assuming some average activity) or power per MB/s BW
        Average power while inactive (CKE mode/all pages closed)

Output:
    Lowest caculated power efficient way to run the pipeline

Algorithm:
1. Iterate over selected (or all) pipeline ordering alternatives (sequential, parallel, sequential + parallel, etc.).
    Foe each pipeline ordering:
    1.1. Calculate duty cycles for each unit:
        Duty cycle for units that work alone is max(computation duty cycle, required mem bw/available memory bw)
        Duty cycle for units that work in parallel is max(compute duty cycle, total required mem bw (for all parallel units)/available memory bw)
    1.2. Calculate voltage duty cycle according to duty cycles and pipeline ordering (e.g. a group of two units can have its voltage turned off only when both are inactive).
    1.3. Calculate power per unit:
        Power = duty_cycle * active power + voltage duty cycle * inactive power
    1.4. Calculate power of memory sub-unit using required bandwidth and total active duty cycle (of all units, per pipelining). When all units are idle assume all pages arte closed (memory power while inactive)
    1.5. Sum power of all units as well as memory sub unit to get total power for the configuration (pipeline ordering)
2. Produce as output the pipeline ordering with lowest total power Table 1 depicts detailed processing corresponding to the flowchart in FIG. 5. In the above processing, the total power is the sum of the various units (average) power multiplied by their compute duty cycle. Memory may be considered as a unit whose duty cycle is the total of the duty cycles of all of the units' memory bandwidth requirements. The power computation should also take into consideration the low power mode of each of the units, multiplied by the off duty cycle (1-duty cycle). In the example in this embodiment, where Pdecode is the power consumed by the CODEC unit, Pcomp is the power consumed by the COMP unit, and Pie the power consumed by the IE unit, Pddr the power consumed by memory in the active state, and Pddr_SelfRefresh the power consumed by the memory in self-refresh mode, the total power is:

$$P_{decode}*10\% + P_{comp}*7\% + P_{ie}*17\% + P_{ddr}*32\% + P_{ddr\_SelfRefresh}*68\%.$$

This equation lists the average power of the various units, neglecting their power while turned off (except PDDR_SelfRefresh, the memory low power state, which is usually too high to be neglected). In order to make computation more accurate, the leakage power can be added, multiplied by the actual duty cycle (the maximum between the compute and total memory bandwidth.

Based on the above power computation, which uses constants for the average power for the various units, the software may determine which way is likely to be the most power efficient way to run.

It should be noted that the computation is an example only, and can be refined to include frequency of operation, memory traffic mix, core utilization and other factors. Furthermore, the method can be applied statically (pre-determined power aware pipeline) or dynamically.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "computing" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable storage medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A method comprising:
    forming a plurality of pipeline orderings, each pipeline ordering comprising one of a sequential, a parallel, or a sequential and parallel combination of a plurality of stages of a pipeline;
    analyzing the plurality of pipeline orderings to determine a total power of each of the orderings; and
    selecting one of the plurality of pipeline orderings based on the determined total power of each of the plurality of pipeline orderings.

2. The method of claim 1 wherein forming a plurality of pipeline orderings further comprises iterating over a plurality of pipeline ordering alternatives.

3. The method of claim 1 wherein determining the total power of each of the orderings further comprises:
    for each stage,
        determining a duty cycle for the stage;
        determining a voltage duty cycle for the stage;
        determining a power for the stage based at least in part on the duty cycle and the voltage duty cycle;
        determining a duty cycle for each parallel combination for each stage; and
        determining a power for a memory and/or other shared resource to be used for each pipeline ordering based at least in part on the duty cycle for each stage and a memory and/or other shared resource bandwidth for each stage.

4. The method of claim 3 wherein determining the duty cycle for each stage further comprises determining the duty cycle based at least in part on a computation duty cycle of the stage and on a fractional memory and/or other shared resource bandwidth required by the stage.

5. The method of claim 3 wherein determining the duty cycle for each parallel combination for each stage comprises determining the duty cycle for each parallel combination for each stage based at least in part on a fraction of available memory and/or other shared resource bandwidth required by all of the stages in each parallel combination for each stage.

6. The method of claim 1 wherein the total power of each of the orderings further comprises a sum of the power of all stages in the ordering and a power for memory and/or other shared resource to be used for the ordering.

7. The method of claim 1 wherein selecting one of the plurality of pipeline orderings based on the determined total power for each pipeline ordering comprises selecting a pipeline ordering with the lowest determined total power.

8. A processor based platform comprising:
    a processor;
    a memory; and
    logic to
        form a plurality of pipeline orderings, each pipeline ordering comprising one of a sequential, a parallel, or a sequential and parallel combination of a plurality of stages of a pipeline, each stage to execute on a hardware unit of the platform;

analyze the plurality of pipeline orderings to determine a total power of each of the orderings; and select one of the plurality of pipeline orderings based on the determined total power of each of the plurality of pipeline orderings.

9. The processor based platform of claim 8 wherein the logic to form a plurality of pipeline orderings is to iterate over a plurality of pipeline ordering alternatives.

10. The processor based platform of claim 8 wherein the logic to determine the total power of each of the orderings is to:

for each stage,
  determine a duty cycle for the stage;
  determine a voltage duty cycle for the stage;
  determine a power for the stage based at least in part on the duty cycle and the voltage duty cycle;
  determine a duty cycle for each parallel combination for each stage; and
  determine a power for a memory and/or other shared resource to be used for each pipeline ordering based at least in part on the duty cycle for each stage and a memory and/or other shared resource bandwidth for each stage.

11. The processor based platform of claim 10 wherein the logic to determine the duty cycle for each stage is to determine the duty cycle based at least in part on a computation duty cycle of the stage and on a fractional memory and/or other shared resource bandwidth required by the stage.

12. The processor based platform of claim 10 wherein the logic to determine the duty cycle for each parallel combination for each stage is to determine the duty cycle for each parallel combination for each stage based at least in part on a fraction of available memory and/or other shared resource bandwidth required by all of the stages in each parallel combination for each stage.

13. The processor based platform of claim 8 wherein the total power of each of the orderings comprises a sum of the power of all stages in the ordering and a power for memory and/or other shared resource to be used for the ordering.

14. The processor based platform of claim 8 wherein the logic to select one of the plurality of pipeline orderings based on the determined total power for each pipeline orderings is to select a pipeline ordering with the lowest determined total power.

15. A machine readable storage medium having stored thereon instructions that when accessed by a machine causes the machine to perform a method, the method comprising:

forming a plurality of pipeline orderings, each pipeline ordering comprising one of a sequential, a parallel, or a sequential and parallel combination of a plurality of stages of a pipeline;

analyzing the plurality of pipeline orderings to determine a total power of each of the orderings; and selecting one of the plurality of pipeline orderings based on the determined total power of each of the plurality of pipeline orderings.

16. The machine readable medium of claim 15 wherein forming a plurality of pipeline orderings further comprises iterating over a plurality of pipeline ordering alternatives.

17. The machine readable medium of claim 15 wherein determining the total power of each of the orderings further comprises:

for each stage,
  determining a duty cycle for the stage;
  determining a voltage duty cycle for the stage;
  determining a power for the stage based at least in part on the duty cycle and the voltage duty cycle;
  determining a duty cycle for each parallel combination for each stage; and
  determining a power for memory and/or other shared resource to be used for each pipeline ordering based at least in part on the duty cycle for each stage and a memory bandwidth for each stage.

18. The machine readable medium of claim 17 wherein determining the duty cycle for each stage further comprises determining the duty cycle based at least in part on a computation duty cycle of the stage and on a fractional memory and/or other shared resource bandwidth required by the stage.

19. The machine readable medium of claim 17 wherein determining the duty cycle for each parallel combination for each stage comprises determining the duty cycle for each parallel combination for each stage based at least in part on a fraction of available memory and/or other shared resource bandwidth required by all of the stages in each parallel combination for each stage.

20. The machine readable medium of claim 15 wherein the total power of each of the orderings further comprises a sum of power of all stages in the ordering and the power for a memory and/or other shared resource to be used for the ordering.

21. The machine readable medium of claim 15 wherein selecting one of the plurality of pipeline orderings based on the determined total power of each of the plurality of pipeline orderings further comprises selecting a pipeline ordering with the lowest determined total power.

* * * * *